United States Patent
Berger

(10) Patent No.: US 11,999,373 B2
(45) Date of Patent: Jun. 4, 2024

(54) OPERATING METHOD FOR AN AUTONOMOUSLY OPERATABLE DEVICE, AND AN AUTONOMOUSLY OPERATABLE DEVICE

(71) Applicant: AUDI AG, Ingolstadt (DE)

(72) Inventor: Karsten Berger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 735 days.

(21) Appl. No.: 17/049,864

(22) PCT Filed: Apr. 30, 2019

(86) PCT No.: PCT/EP2019/061068
§ 371 (c)(1),
(2) Date: Oct. 22, 2020

(87) PCT Pub. No.: WO2019/211282
PCT Pub. Date: Nov. 7, 2019

(65) Prior Publication Data
US 2021/0237763 A1 Aug. 5, 2021

(30) Foreign Application Priority Data

May 2, 2018 (DE) ..................... 10 2018 206 712.0

(51) Int. Cl.
*B60W 60/00* (2020.01)
*B60W 30/14* (2006.01)
(Continued)

(52) U.S. Cl.
CPC ........ *B60W 60/001* (2020.02); *B60W 30/143* (2013.01); *B60W 50/038* (2013.01);
(Continued)

(58) Field of Classification Search
CPC ................................................ B60W 60/001
See application file for complete search history.

(56) References Cited

U.S. PATENT DOCUMENTS 9,274,525 B1 3/2016 Ferguson et al.
9,569,404 B2 * 2/2017 Nakamura ................ G06F 8/71
(Continued)

FOREIGN PATENT DOCUMENTS

DE 102014018913 A1 6/2016
DE 102015007242 A1 12/2016
(Continued)

OTHER PUBLICATIONS

International Preliminary Report on Patentability directed to related International Patent Application No. PCT/EP2019/061068, dated Nov. 3, 2020, with attached English-language translation; 20 pages.
(Continued)

*Primary Examiner* — Michael A Berns
(74) *Attorney, Agent, or Firm* — Sterne, Kessler, Goldstein & Fox P.L.L.C.

(57) ABSTRACT

The disclosure relates to an operating method for an autonomously operatable device. According to the method, sensor data relating to a current surroundings condition of the device are detected using at least one sensor device in an autonomous operating mode, and the sensor data is supplied to a control algorithm which is implemented as a machine learning algorithm and which learns in a self-contained manner. The control algorithm estimates the current surroundings condition of the device on the basis of the sensor data and makes a control decision. A degree of quality relating to the control decision is ascertained using a monitoring algorithm which is independent of the control algorithm, and the device is operated according to the control decision depending on the ascertained degree of quality of the control decision or the control decision is rejected and the device is set to a secure operating state.

10 Claims, 1 Drawing Sheet

(51) Int. Cl.
    *B60W 50/038*     (2012.01)
    *B60W 50/04*     (2006.01)
    *G06N 20/00*     (2019.01)
    *B60W 50/02*     (2012.01)

(52) U.S. Cl.
    CPC ............ *B60W 50/04* (2013.01); *G06N 20/00* (2019.01); *B60W 2050/021* (2013.01); *B60W 2050/0215* (2013.01)

(56) References Cited

U.S. PATENT DOCUMENTS

| | | | | |
|---|---|---|---|---|
| 9,606,538 | B2* | 3/2017 | Kopetz | ............... B60W 30/143 |
| 10,055,652 | B2 | 8/2018 | Myers et al. | |
| 10,782,700 | B2* | 9/2020 | Kopetz | ............... G05D 1/0214 |
| 10,919,524 | B2* | 2/2021 | Poledna | ............ B60W 30/0956 |
| 11,340,892 | B2* | 5/2022 | Poledna | .............. G06F 11/3013 |
| 11,663,370 | B2* | 5/2023 | Heersink | ................. G06F 21/88 |
| | | | | 726/34 |
| 2013/0173767 | A1* | 7/2013 | Nakamura | .......... H04L 43/0876 |
| | | | | 717/121 |
| 2017/0369074 | A1 | 12/2017 | Mathes et al. | |
| 2018/0089563 | A1 | 3/2018 | Redding et al. | |
| 2019/0100195 | A1 | 4/2019 | Rothhamel | |
| 2021/0039669 | A1* | 2/2021 | Watson | ................. B60W 50/04 |
| 2021/0237763 | A1* | 8/2021 | Berger | ................. G05D 1/0246 |

FOREIGN PATENT DOCUMENTS

| | | |
|---|---|---|
| DE | 102016009655 A1 | 4/2017 |
| DE | 102017105903 A1 | 9/2017 |
| DE | 102016205780 A1 | 10/2017 |
| DE | 102016207276 A1 | 11/2017 |

OTHER PUBLICATIONS

International Search Report and Written Opinion of the International Searching Authority directed to related International Patent Application No. PPCT/EP2019/061068, dated Jul. 25, 2019, with attached English-language translation; 28 pages.

* cited by examiner

1 - Motor Vehicle
2 - Operating Controller
3 - Camera
6 - First Controller
8 - Control Algorithm
10 - Second controller
12 - Monitoring Algorithm
14 - Third Controller
16 - Decision Algorithm
18 - Actuator Controller
32 - Wall B - Control Command
D - Sensor Data
E - Control Decision
G - Result Quality
S - Control Signal

OPERATING METHOD FOR AN AUTONOMOUSLY OPERATABLE DEVICE, AND AN AUTONOMOUSLY OPERATABLE DEVICE

TECHNICAL FIELD

The disclosure relates to an operating method for an autonomously operatable device.

BACKGROUND

Devices that are operatable autonomously are used and are to be used increasingly in the future, for example to replace an operator of the device or to be able to at least temporarily relieve them. For example, such a device that is operatable autonomously can be vehicles, for example passenger cars, aircraft, trucks, or also production robots. In order to be able to operate such devices autonomously as flexibly as possible, they are usually controlled by machine learning algorithms. These algorithms are optionally learned ("trained") during a learning or training phase in order to achieve the desired results in as many different situations as possible, i.e., to make appropriate decisions that the user considers to be correct. In this case, the "learning" of the algorithms is usually completed before the device is actually put into operation. Optionally, algorithms can also be used that (continue to) learn during real operation.

A disadvantage of these machine learning algorithms, however, is that the decisions made are of a probabilistic nature, i.e., based on probabilities. Since it is therefore difficult to estimate in which situations such machine learning algorithms make wrong decisions, their use for safety-critical applications, for example autonomous driving of vehicles in road traffic, is problematic.

DE 10 2016 009 655 A1 discloses, for example, to use two machine learning algorithms, in particular two neural networks, in a vehicle in order to generate two separate decisions relating to the operation of the vehicle. These are then compared with one another and, in the event of unequal decisions, one of the two decisions is checked with regard to compliance with ethical and/or security criteria. If this decision fulfills these criteria, the procedure continues according to this decision; otherwise the other decision is chosen.

DETAILED DESCRIPTION

Figure 1:
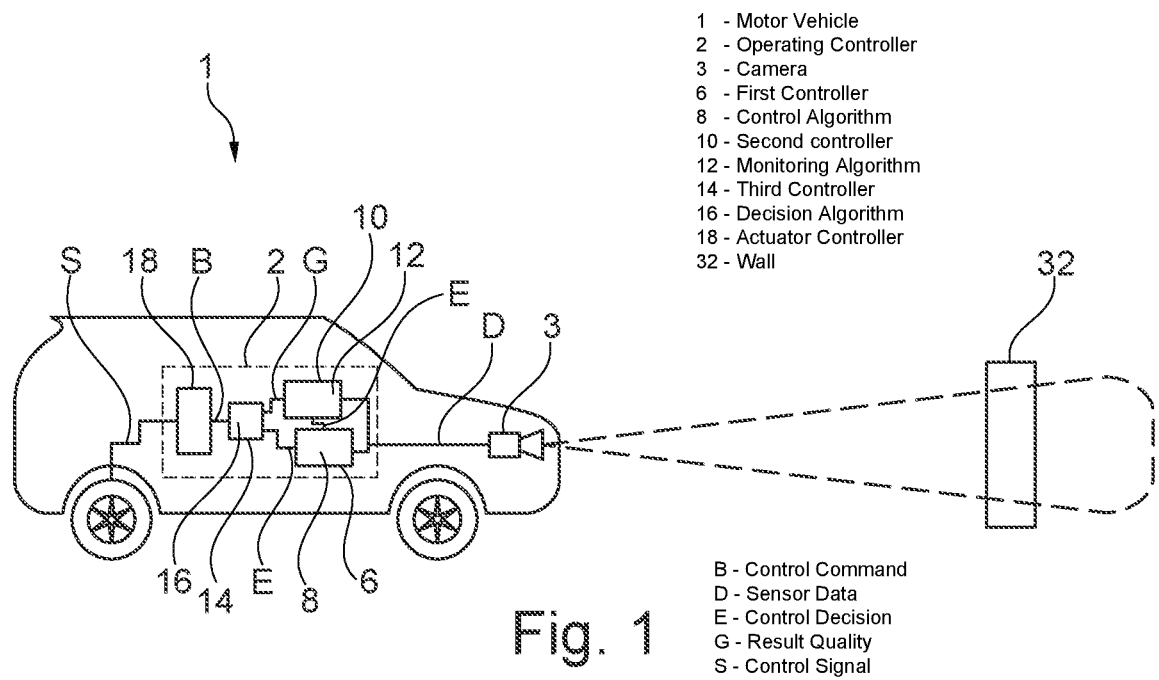
FIG. 1 is a schematic side view of a motor vehicle that is designed for an autonomous driving operation.

The disclosure relates to an operating method for an autonomously operatable device. Furthermore, the disclosure relates to a device that is autonomously operatable and is operated in particular according to the operating method.

Devices that are operatable autonomously are used and are to be used increasingly in the future, for example to replace an operator of the device or to be able to at least temporarily relieve them. For example, such a device that is operatable autonomously can be vehicles, for example passenger cars, aircraft, trucks, or also production robots. In order to be able to operate such devices autonomously as flexibly as possible, they are usually controlled by machine learning algorithms. These algorithms are optionally learned ("trained") during a learning or training phase in order to achieve the desired results in as many different situations as possible, i.e., to make appropriate decisions that the user considers to be correct. In this case, the "learning" of the algorithms is usually completed before the device is actually put into operation. Optionally, algorithms can also be used that (continue to) learn during real operation.

A disadvantage of these machine learning algorithms, however, is that the decisions made are of a probabilistic nature, i.e., based on probabilities. Since it is therefore difficult to estimate in which situations such machine learning algorithms make wrong decisions, their use for safety-critical applications, for example autonomous driving of vehicles in road traffic, is problematic.

DE 10 2016 009 655 A1 discloses, for example, to use two machine learning algorithms, in particular two neural networks, in a vehicle in order to generate two separate decisions relating to the operation of the vehicle. These are then compared with one another and, in the event of unequal decisions, one of the two decisions is checked with regard to compliance with ethical and/or security criteria. If this decision fulfills these criteria, the procedure continues according to this decision; otherwise the other decision is chosen.

The disclosure is based on the object of allowing the most secure possible autonomous operation of a device.

This object is achieved according to the disclosure by an operating method for an autonomously operatable device with the features in accordance with claim 1. Furthermore, this object is achieved according to the disclosure by an autonomously operatable device having the features in accordance with claim 9. Further advantageous and in part inventive embodiments and developments of the disclosure are set out in the subclaims and the following description.

The operating method according to the disclosure is used to operate an autonomously operatable device. According to the method, in an autonomous operating mode of the device, sensor data relating to a current surroundings condition of the device are detected using at least one sensor device assigned in particular to the device. These sensor data are supplied to a control algorithm that is implemented as a machine learning algorithm and which learns in a self-contained manner. The control algorithm estimates the current surroundings condition of the device on the basis of the sensor data. The control algorithm preferably analyzes and classifies the surroundings condition. The control algorithm then makes a control decision as a result inferred from the assessment (i.e., in particular the analysis and classification) (which is directed in particular to the further operation of the device). Using a monitoring algorithm that is independent of the control algorithm, a quality (hereinafter also referred to as "result quality") relating to the control decision is ascertained. Depending on the ascertained result quality, the device is then operated according to the control decision (in particular is continued to be operated) or the control decision is rejected and the device is set to a secure operating state.

Thus, in the intended autonomous operating mode, two independent algorithms are used, the algorithm used to monitor the other algorithm being designed in such a way that it does not output a result that is parallel to the other algorithm (in particular that is directed towards the same target), but said algorithm preferably only ascertains how high the probability is that the result ascertained by the other algorithm is "reliable" or "correct."

"Learns in a self-contained manner" is understood in this case and in the following in particular to mean that the machine learning control algorithm no longer learns in the intended, i.e., real or actual, autonomous operation. Its "decision parameters" are therefore unchangeable or fixed in actual operation; i.e., after the training or learning phase.

Because the control algorithm and the monitoring algorithm are designed independently of one another and are aimed at different goals (namely the finding of a control decision and the assessment of the result quality), a comparatively secure decision can advantageously be made relating to the further operation of the device. This is because the monitoring algorithm is preferably not designed to check the measure contained in the control decision, but rather to output, independently of the measure contained, in particular a probability as to whether the result containing the control decision can be fundamentally correct. Because the control algorithm learns in a self-contained manner, the operating method can also be carried out in a comparatively conservative manner, in particular with regard to storage and computing capacity, since resources for the ongoing learning process can be saved. In addition, an algorithm which learns in a self-contained manner can be monitored comparatively easily, since its behavior cannot change in an unforeseen way due to a continued learning process.

In the scope of the operating method, the decision regarding the implementation of the control decision or the transfer of the device to the safe operating state is preferably made by means of a particularly deterministic "decision algorithm." This is preferably implemented independently of the control and monitoring algorithms. In a simple variant, this decision algorithm carries out, in particular, a threshold value comparison of the ascertained result quality and, if the value falls below the threshold value, initiates the secure operating state.

In a preferred variant of the method, a machine learning but preferably algorithm which learns in a self-contained manner is used as the monitoring algorithm. This in turn contributes to the conservation of resources described above. Furthermore, the already learned behavior cannot be changed by a continued learning process, which could lead to unforeseen results.

In an optional variant of the method, for example, at least one camera—in particular pointing in the direction of travel—is used as the sensor device for optical detection of the sensor data. Additionally or alternatively, radar sensors and/or other proximity sensors, optionally also pressure sensors, are used for detecting the sensor data.

In a further preferred variant of the method, the monitoring algorithm is learned to recognize whether the current surroundings condition of the device is contained in learning data (also: "training data") of the control algorithm and to infer the result quality therefrom (i.e., in particular a probable flaw of the control decision). In the intended, autonomous operating mode of the device, the monitoring algorithm thus ascertains whether the current surroundings condition of the device is included in the training data, and infers the result quality therefrom. The monitoring algorithm preferably reduces the result quality (in particular its value) if the surroundings condition characterized by the sensor data (in particular the "scenario" resulting therefrom) is unknown; i.e., not contained in the learning data of the control algorithm. One assessment criterion for the result quality is therefore the familiarity with the surroundings condition. If the current surroundings condition is not adequately represented by the learning data and thus cannot be sufficiently derived from the learning data (or: "training scenarios") by the control algorithm (or if the surroundings condition is not sufficiently comparable with said scenarios), the monitoring algorithm thus infers that the control algorithm may in specific circumstances come to a wrong decision (and thus not to a correct decision with sufficient security). In this case, the result quality is reduced.

In an additional or alternative, expedient variant of the method to the variant of the method described above, the monitoring algorithm is learned to ascertain a measure for an occupancy of a system resource of a first controller on which the control algorithm is processed and to infer the result quality based on this measure. In the intended, autonomous operating mode of the device, the monitoring algorithm thus ascertains this measure and infers the result quality therefrom. As a measure for the system resource of the controller, for example, a computing time is ascertained for which the control algorithm occupies the controller, in particular a microprocessor of the controller, i.e., how long the control algorithm needs to calculate (i.e., to make) the control decision. If the computing time exceeds a period of time of 100 milliseconds that is usual for making the control decision, the monitoring algorithm infers that an unusual situation is present (also referred to as "exceptional situation") and accordingly reduces the quality of the decision. The occupancy of a main memory (in particular a portion of it) of the first controller is ascertained as an additional or alternative measure. If the control algorithm occupies a comparatively large portion of the available main memory (in particular in comparison to usual calculation processes), this also indicates an exceptional situation. Optionally, the monitoring algorithm also uses the sensor data supplied to the control algorithm, in particular to assess whether the sensor data have changed so slightly compared to a previous situation (i.e., in particular compared to the previous control decision) that increased resource expenditure is not to be expected. The monitoring algorithm is thus optionally learned to estimate the system resources that are likely to be requested or to be occupied by the control algorithm and, on this basis, to assess the actual degree of occupancy.

In an expedient method variant of the operating method, which also represents an independent disclosure, the sensor data relating to the current surroundings condition are first detected using the at least one sensor device and supplied to the control algorithm. The operator then uses the sensor data to assess the current surroundings condition and makes the control decision. A decision methodology of the control algorithm is selected in this case in such a way that a course of individual decisions leading to the control decision is disclosed; i.e., in particular, can be comprehended. During the learning phase of the control algorithm, the respective output control decision is checked for correctness (in particular for conformity with the surroundings situation selected and supplied for learning). For example, it is checked whether an obstacle, in particular, is correctly recognized and whether a corresponding decision is made to prevent a collision (namely the control decision); for example, slowing down the current movement, an evasive maneuver or the like. In the event of an error—i.e., if no corresponding (expected) decision is made—the course of the individual decisions is examined for input from parts of the sensor data (for example, individual data points) forming the basis of the wrong decision of the control algorithm. Such error-related parts of the sensor data are then filtered in the (in particular real) autonomous operating mode, i.e., preferably not supplied to the control algorithm or not taken into consideration by it. This variant of the method is basically independent of the monitoring algorithm described above.

In a further expedient variant of the method, the monitoring algorithm is learned to recognize in particular whether the sensor data supplied to the control algorithm form at least partially (for example in the form of individual data points) a basis for a wrong decision by the control algorithm. In particular, this variant of the method is at least partially combined with the above method variant in that, as described above, the error-related parts of the sensor data are identified during the learning phase of the control algorithm and supplied to the monitoring algorithm for training with regard to the estimation of the result quality. In other words, the monitoring algorithm is preferably (optionally additionally) trained to recognize these error-related parts of the sensor data, and is thus designed to use the detection of such error-related parts of the sensor data to infer the result quality, in particular to reduce the result quality if such parts of the sensor data which are known to be leading to errors can be identified.

In a preferred variant of the method, the monitoring algorithm is implemented by a model that is different from the control algorithm. This means that the monitoring algorithm is based on a different machine learning algorithm, in particular a different "learning method." For example, a decision tree model (for example "boosted decision tree," "decision forests," or "random forests") is used for the control algorithm and a neural network or the like is used for the monitoring algorithm. This further promotes the independence of the two algorithms from one another. The development of the control algorithm by the decision tree model is also advantageous with regard to the disclosure of the course of the decisions described above. In this case, the course of the individual decisions can be comprehended particularly easily using the respective intermediate steps.

In an expedient variant of the method, the device has the above-mentioned first controller and a second controller which is independent of this and which are preferably designed independently of one another in terms of hardware. The control algorithm is processed by the first controller and the monitoring algorithm is processed by the second controller. This allows the two algorithms to be processed separately in a particularly simple manner and advantageously prevents mutual interference. In addition, a simultaneous influencing of both algorithms by a hardware error in a shared controller is avoided. Optionally, the device also has a third (independent) controller on which the decision algorithm described above is implemented and processed.

In an optional variant of the method, a further machine learning additional algorithm, but preferably an additional algorithm which learns in a self-contained manner is used, in particular for the case that the result quality from the monitoring algorithm is assessed as bad, i.e., particularly low. For example, this additional algorithm is used to find an alternative control decision based on the sensor data. In this case, a further monitoring algorithm (in particular analogous to the "first" monitoring algorithm described above) is preferably processed in order to ascertain the result quality of the additional algorithm or a combination of the control algorithm and the additional algorithm.

At least one further (in particular independently implemented) monitoring algorithm is optionally used to ascertain the result quality. Optionally, the respective ascertained result qualities are averaged. In this way, the accuracy of the ascertained result quality can advantageously be increased.

In a preferred variant of the method, the device is a motor vehicle, in particular a passenger motor vehicle. The motor vehicle is set to the secure operating state in that a reduction in the driving speed is preferably initiated. Optionally, the driving speed is "only" reduced and, if necessary, the control is transferred to a driver of the vehicle; preferably in response to a corresponding warning. Alternatively (or, if necessary, if the driver does not take over control), the driving speed is reduced until the motor vehicle stops and the motor vehicle is parked if necessary (on a motorway, for example on a hard shoulder).

The autonomously operatable device according to the disclosure, which is formed in particular by the motor vehicle (alternatively, for example, by another vehicle or by an industrial robot), comprises the at least one sensor device for detecting the sensor data relating to the current surroundings condition of the device. In addition, the device comprises an operating controller which is designed to carry out the operating method described above, in particular automatically. In other words, the operating controller is designed to feed the sensor data to the control algorithm, to assess the current surroundings condition of the device using the control algorithm on the basis of the sensor data and to make the control decision. Furthermore, the operating controller is designed to ascertain the result quality of the control decision using the monitoring algorithm which is independent of the control algorithm and, depending on the ascertained result quality, to operate the device according to the control decision (in particular, to continue to operate) or to reject the control decision and to set the device to a secure operating state.

In a preferred embodiment, the operating controller has the first controller and the second controller that is independent of it and that are each designed separately from one another in terms of hardware. The control algorithm is implemented on the first controller and the monitoring algorithm is implemented on the second controller.

In a preferred embodiment, the operating controller is at least substantially formed by a microcontroller with a processor and a data storage, in which the functionality for performing the operating method according to the disclosure is implemented in the form of operating software (firmware). In this case, the operating method is carried out automatically when the operating software is executed in the microcontroller. Alternatively, the operating controller is formed by a non-programmable electronic component, for example an ASIC. In this case, the functionality for performing the operating method according to the disclosure is implemented in terms of circuitry. The first and second controllers and, if applicable, the third controller, are each designed as hardware-independent (sub)controllers of the operating controller and preferably analogous to the operating controller, in particular by a microcontroller, each with a processor and a data storage, on which the respective algorithms are implemented as mutually independent software components.

The conjunction "and/or" is to be understood in this case and in the following in particular in such a way that the features linked by means of this conjunction can be designed both together and as alternatives to one another.

Embodiments of the disclosure are explained in more detail below with reference to a drawing FIG. 1 is a schematic side view of a motor vehicle that is designed for an autonomous driving operation.

Figure 2:
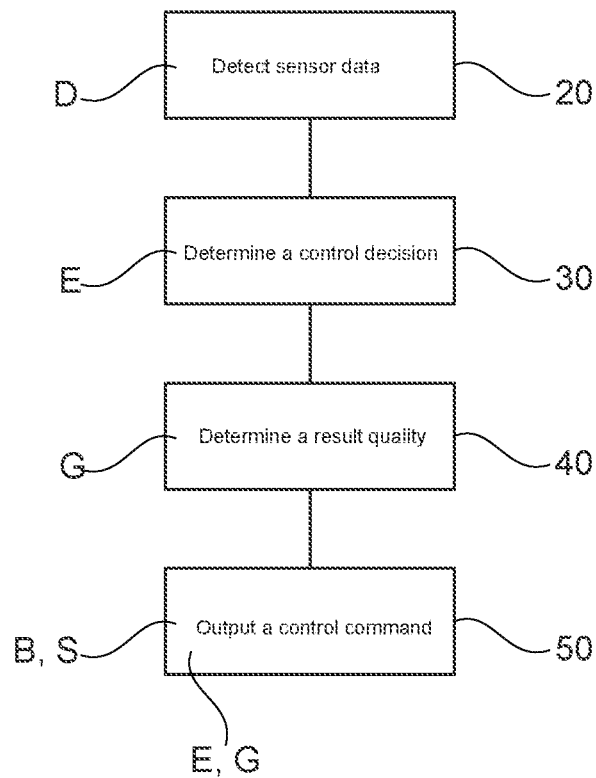
FIG. 2 is in a schematic flowchart of an operating method carried out by an operating controller of the motor vehicle.

FIG. 2 is in a schematic flowchart of an operating method carried out by an operating controller of the motor vehicle.

Corresponding parts (and variables) are always provided with the same reference signs in all drawings.

In FIG. 1, a motor vehicle 1 is shown schematically that represents an autonomously operatable device. The motor vehicle 1 has an operating controller 2 which is designed to carry out an operating method described in more detail below. Furthermore, the motor vehicle 1 has a sensor device, specifically a camera 3, which is designed to optically detect the surroundings of the motor vehicle 1 during the driving operation of the motor vehicle 1 and to provide the sensor data D detected in the process to the operating controller 2.

The operating controller 2 comprises a first controller 6 on which a control algorithm 8 is implemented so that it can run. Furthermore, the operating controller 2 comprises a second controller 10, on which a monitoring algorithm 12 is implemented so that it can run. In addition, the operating controller 2 comprises a third controller 14 on which a decision algorithm 16 is implemented so that it can run. The operating controller 2 further comprises an actuator controller 18 which is designed to control actuators of the motor vehicle 1, specifically a traction motor, brakes, and a steering of the motor vehicle 1.

In an autonomous (driving) operating mode, the operating controller 2 carries out the operating method shown in FIG. 2. To this end, in a first method step 20, the operating controller 2 uses the camera 3 to detect the sensor data D and feeds them to the first controller 6 and thus to the control algorithm 8. The control algorithm 8 is a machine learning algorithm which learns in a self-contained manner which is implemented using a decision tree methodology.

The control algorithm 8 is learned (or: trained) to assess the surroundings situation, i.e., the surroundings condition of the motor vehicle 1, in a method step 30 on the basis of the sensor data D. In other words, the control algorithm 8 derives an "image" (or: "scenario") of the surroundings situation from the sensor data D, ascertains whether there are any obstacles located in the future movement path (indicated by a wall 32 in FIG. 1), and then outputs a control decision E as an inferred result. In the present case—i.e., the control algorithm 8 has inferred from the sensor data D that the wall 32 is present in the movement path—the control decision E is directed either to an evasive maneuver (if the possible evasive path is free of further obstacles) or to a braking maneuver.

In a method step 40, the monitoring algorithm 12 ascertains a result quality G of the control decision E. The result quality G reflects a probability of whether the control decision E is correct or incorrect. For this purpose, the operating controller 2 feeds the sensor data D to the second controller 10. In an optional variant of this embodiment, the control decision E is also supplied to the second controller 10. The monitoring algorithm 12 is designed according to a method that deviates from the control algorithm 8, in this case, specifically, as a neural network. The control algorithm 8 has been completely trained to recognize whether the specific surroundings situation (the current scenario) that can be derived from the sensor data D can be mapped by the training data (training scenarios) by means of which the control algorithm 8 was trained. If this is the case, the monitoring algorithm 12 sets the result quality to a high value, which indicates that there is a high probability that the control decision E is correct. However, if the training data does not map the surroundings situation characterized by the sensor data D, the monitoring algorithm 12 assumes that the control algorithm 8 cannot achieve a correct result with high reliability based on the sensor data D and accordingly sets the result quality G to a low value.

In an optional embodiment, the monitoring algorithm 12 ascertains the result quality G on the basis of occupied system resources, specifically the computing time and/or the occupied portion of the main memory of the first controller 6. If the computing time and/or the occupied portion of the main memory exceeds a specific value, the monitoring algorithm 12 sets the result quality G to a low value.

The result quality G and the control decision E are supplied to the third controller 14 and thus to the decision algorithm 16 in a method step 50. The decision algorithm 16 is designed to be deterministic and uses the result quality G to decide whether the control decision E should be carried out or whether the risk that the control decision E will lead to a critical situation is too high. In the latter case, the decision algorithm 16 decides to convert the motor vehicle 1 to a secure operating state, in that the driving speed is reduced and the motor vehicle 1 is parked. In both cases, the decision algorithm 16 outputs a control command B to the actuator controller 18. If the result quality G is high, this control command B contains the control decision E; otherwise, it contains corresponding instructions to establish the secure operating mode. In order to carry out the control command B, the actuator controller 18 translates the control command B into corresponding control signals S directed to the respective actuator.

The subject matter of the disclosure is not limited to the embodiment described above. Rather, further embodiments of the disclosure can be derived from the above description by a person skilled in the art.

The invention claimed is:

1. An operating method for an autonomously operatable device, wherein the operating method is in an autonomous operating mode, the operating method comprising:
   detecting, by at least one sensor device, sensor data relating to a current surroundings condition of the autonomously operatable device in the autonomous operating mode;
   supplying, by the at least one sensor device, the sensor data to a control algorithm, wherein the control algorithm is a machine learning algorithm, and wherein the control algorithm learns in a self-contained manner;
   assessing, by the control algorithm, the current surroundings condition of the autonomously operatable device;
   making, by the control algorithm, a control decision based on the sensor data;
   determining, by a monitoring algorithm, a degree of quality relating to the control decision, wherein the monitoring algorithm is independent of the control algorithm; and
   performing one of following:
   operating the autonomously operatable device according to the control decision depending on the degree of quality; or
   rejecting the control decision and setting the autonomously operatable device to a secure operating state,
   wherein the monitoring algorithm determines a measure for an occupancy of a system resource of a first controller, and wherein the first controller processes the control algorithm and infers the degree of quality based on the measure.

2. The operating method according to claim 1, wherein the monitoring algorithm uses a second machine learning algorithm that learns in a self-contained manner.

3. The operating method according to claim 2,
   wherein the monitoring algorithm recognizes whether the current surroundings condition of the autonomously operatable device is contained in learning data of the control algorithm and to infer the degree of quality therefrom.

4. The operating method according to claim 1, further comprising:

selecting a decision methodology of the control algorithm;
disclosing a course of individual decisions leading to the control decision;
checking a correctness of an output of the control decision during a learning phase of the control algorithm;
determining an event of an error based on checking the correctness;
examining the course of the individual decisions;
determining an input that is a part of the sensor data forming a basis for the control decision of the control algorithm; and
filtering the part of the sensor data in the autonomous operating mode.

5. The operating method according to claim 4,
wherein the monitoring algorithm determines that the part of the sensor data forms the basis of the control decision.

6. The operating method according to claim 1, further comprising:
implementing the monitoring algorithm using a first model; and
implementing the control algorithm using a second model,
wherein the first model is different from the second model.

7. The operating method according to claim 1, further comprising:
processing, by a first controller of the autonomously operatable device, the control algorithm; and
processing, by a second controller of the autonomously operatable device, the monitoring algorithm,
wherein the first controller is different from the second controller.

8. The operating method according to claim 1, wherein the autonomously operatable device is a motor vehicle, the operating method further comprising:
setting the motor vehicle to the secure operating state by initiating a reduction in a driving speed of the motor vehicle.

9. An autonomously operatable device, wherein the autonomously operatable device is a motor vehicle, the autonomously operatable device comprising:
a sensor device configured to:
detect sensor data relating to a current surroundings condition of the autonomously operatable device; and
supply the sensor data to a control algorithm, wherein the control algorithm is a machine learning algorithm, and wherein the control algorithm learns in a self-contained manner; and
an operating controller configured to:
assess, by the control algorithm, the current surroundings condition of the autonomously operatable device;
make, by the control algorithm, a control decision based on the sensor data;
determine, by a monitoring algorithm, a degree of quality relating to the control decision, wherein the monitoring algorithm is independent of the control algorithm; and
perform one of following:
operate the autonomously operatable device according to the control decision depending on the degree of quality; or
reject the control decision and setting the autonomously operatable device a secure operating state,
wherein the monitoring algorithm determines a measure for an occupancy of a system resource of a first controller, and wherein the first controller processes the control algorithm and infers the degree of quality based on the measure.

10. The autonomously operatable device according to claim 9,
wherein the operating controller comprises a first controller and a second controller,
wherein the first controller is configured to implement the control algorithm,
wherein the second controller is configured to implement the monitoring algorithm,
wherein the second controller is independent of the first controller, and
wherein the first controller and the second controller are each designed separately from one another in terms of hardware.

* * * * *